(12) United States Patent
Nakayama et al.

(10) Patent No.: US 10,879,566 B2
(45) Date of Patent: Dec. 29, 2020

(54) ELECTROLYTIC SOLUTION AND ELECTROCHEMICAL DEVICE

(71) Applicant: MURATA MANUFACTURING CO., LTD., Kyoto (JP)

(72) Inventors: Yuri Nakayama, Kanagawa (JP); Ryuhei Matsumoto, Kanagawa (JP); Hideki Kawasaki, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/320,350

(22) PCT Filed: Apr. 20, 2015

(86) PCT No.: PCT/JP2015/061961
§ 371 (c)(1),
(2) Date: Dec. 20, 2016

(87) PCT Pub. No.: WO2016/006299
PCT Pub. Date: Jan. 14, 2016

(65) Prior Publication Data
US 2017/0162908 A1    Jun. 8, 2017

(30) Foreign Application Priority Data

Jul. 8, 2014   (JP) ................ 2014-140603

(51) Int. Cl.
*H01M 10/0569* (2010.01)
*H01M 10/054* (2010.01)
(Continued)

(52) U.S. Cl.
CPC ........ *H01M 10/0569* (2013.01); *H01G 9/145* (2013.01); *H01G 9/15* (2013.01); *H01G 11/60* (2013.01); *H01G 11/62* (2013.01); *H01M 6/16* (2013.01); *H01M 6/164* (2013.01); *H01M 6/166* (2013.01); *H01M 10/054* (2013.01);
(Continued)

(58) Field of Classification Search
None
See application file for complete search history.

(56) References Cited

U.S. PATENT DOCUMENTS 4,894,302 A    1/1990  Hoffman et al.
2002/0001745 A1*  1/2002  Gartstein ............ H01M 6/5044
                                                   429/61

(Continued)

FOREIGN PATENT DOCUMENTS

CN    103715455      4/2014
JP    2003-100347 A  4/2003
(Continued)

OTHER PUBLICATIONS

International Search Report prepared by the Japan Patent Office dated Jul. 2, 2015, for International Application No. PCT/JP2015/061961.

(Continued)

*Primary Examiner* — Wyatt P McConnell
(74) *Attorney, Agent, or Firm* — Sheridan Ross P.C.

(57) ABSTRACT

An electrolytic solution includes a sulfone and a magnesium salt dissolved in the sulfone, in which the magnesium salt includes magnesium borohydride ($Mg(BH_4)_2$).

24 Claims, 6 Drawing Sheets (51) Int. Cl.
*H01M 10/0568* (2010.01)
*H01M 12/08* (2006.01)
*H01G 11/62* (2013.01)
*H01M 6/16* (2006.01)
*H01G 11/60* (2013.01)
*H01M 12/06* (2006.01)
*H01G 9/145* (2006.01)
*H01G 9/15* (2006.01)
*H01M 8/18* (2006.01)

(52) U.S. Cl.
CPC ....... H01M 10/0568 (2013.01); H01M 12/06 (2013.01); H01M 12/08 (2013.01); *H01M 8/18* (2013.01); *H01M 2300/0028* (2013.01); *Y02E 60/13* (2013.01)

(56) References Cited

U.S. PATENT DOCUMENTS

| | | | | |
|---|---|---|---|---|
| 2004/0214091 | A1* | 10/2004 | Lim | H01M 10/052 |
| | | | | 429/326 |
| 2012/0107698 | A1* | 5/2012 | Muldoon | H01M 10/054 |
| | | | | 429/337 |
| 2014/0038061 | A1* | 2/2014 | Mohtadi | H01M 10/0566 |
| | | | | 429/337 |
| 2014/0127594 | A1* | 5/2014 | Nakayama | G01N 27/26 |
| | | | | 429/403 |
| 2015/0086859 | A1* | 3/2015 | Chang | H01M 4/485 |
| | | | | 429/188 |

FOREIGN PATENT DOCUMENTS

| | | |
|---|---|---|
| JP | 2013-37993 A | 2/2013 |
| JP | 2013-239353 A | 11/2013 |
| JP | 2014-504423 A | 2/2014 |
| JP | 2014-72031 A | 4/2014 |
| WO | WO 2014/022729 A1 | 2/2014 |

OTHER PUBLICATIONS

Mohtadi et al., "Magnesium Borohydride: From Hydrogen Storage to Magnesium Battery," Angewandte Chemie International Edition, vol. 51, No. 39, Sep. 24, 2012, 4 pages.
Extended European Search Report for European Patent Application No. 15818404.4, dated Jan. 23, 2018, 8 pages.
Official Action (no translation available) for Chinese Patent Application No. 201580033598.7, dated Jul. 30, 2018, 4 pages.
Official Action (no translation available) for Chinese Patent Application No. 201580033598.7, dated Mar. 30, 2020, 4 pages.
Official Action (no translation available) for Chinese Patent Application No. 201580033598.7, dated Dec. 2, 2019, 6 pages.
Official Action (no translation available) for Chinese Patent Application No. 201580033598.7, dated Apr. 29, 2019, 4 pages.

* cited by examiner

ELECTROLYTIC SOLUTION AND ELECTROCHEMICAL DEVICE

CROSS REFERENCE TO RELATED APPLICATIONS

This application is a national stage application under 35 U.S.C. 371 and claims the benefit of PCT Application No. PCT/JP2015/061961 having an international filing date of 20 Apr. 2015, which designated the United States, which PCT application claimed the benefit of Japanese Patent Application No. 2014-140603 filed 8 Jul. 2014, the disclosures of which are incorporated herein by reference in their entirety.

TECHNICAL FIELD

The present disclosure relates to an electrolytic solution and an electrochemical device.

BACKGROUND ART

Magnesium batteries use magnesium, which is a resource more abundant and much more inexpensive than lithium, is capable of producing a large amount of electricity per unit volume through an oxidation-reduction reaction as compared with lithium, and has high safety when used in batteries. Therefore, magnesium batteries are attracting attention as next-generation secondary batteries to replace lithium-ion batteries.

Conventional electrolytic solutions for magnesium batteries generally contain an ether solvent, and in particular, tetrahydrofuran (THF)-containing electrolytic solutions are considered to have best properties. However, ether solvents such as THF are difficult to handle because they are highly volatile and many of them are toxic. In addition, the potential window of ether solvent-containing electrolytic solutions (the maximum voltage that can be applied without decomposition of the electrolytic solutions) is as low as up to about 3.0 volts, which makes it difficult to prepare high-voltage magnesium batteries using a magnesium metal negative electrode.

Electrolytic solutions for solving such problems are well known as disclosed by Japanese Patent Application Laid-Open No. 2014-072031. This patent publication discloses an electrolytic solution including: a solvent including a sulfone; and a magnesium salt dissolved in the solvent. The magnesium salt is at least one magnesium salt selected from the group consisting of magnesium chloride ($MgCl_2$), magnesium bromide ($MgBr_2$), magnesium iodide ($MgI_2$), magnesium perchlorate ($Mg(ClO_4)_2$), magnesium tetrafluoroborate ($Mg(BF_4)_2$), magnesium hexafluorophosphate ($Mg(PF_6)_2$), magnesium hexafluoroarsenate ($Mg(AsF_6)_2$), magnesium perfluoroalkylsulfonate ($Mg(R_{f1}SO_3)_2$), wherein $R_{f1}$ is a perfluoroalkyl group, and magnesium perfluoroalkylsulfonylimidate ($Mg((R_{f2}SO_2)_2N)_2$), wherein $R_{f2}$ is a perfluoroalkyl group. Among these magnesium salts, $MgX_2$ (X=Cl, Br, or I) is stated to be particularly preferred.

CITATION LIST

Patent Document

Patent Document 1: Japanese Patent Application Laid-Open No. 2014-072031

SUMMARY OF THE INVENTION

Problems to be Solved by the Invention

Unfortunately, the magnesium salts listed in the patent publication contain a halogen atom. This can require that various components of magnesium batteries be made of highly corrosion-resistant materials.

It is therefore an object of the present disclosure to provide an electrolytic solution that is workable with a magnesium electrode, enables a reversible electrochemical deposition/dissolution reaction of magnesium, contains no halogen atom, and is produced using a non-ether solvent, and to provide an electrochemical device using such an electrolytic solution.

Solutions to Problems

To achieve the object, the present disclosure provides an electrolytic solution including: a sulfone; and a magnesium salt dissolved in the sulfone, wherein the magnesium salt includes magnesium borohydride ($Mg(BH_4)_2$).

To achieve the object, the present disclosure provides an electrochemical device including an electrolytic solution, wherein the electrolytic solution includes a sulfone and a magnesium salt dissolved in the sulfone, and the magnesium salt includes magnesium borohydride ($Mg(BH_4)_2$).

The electrolytic solution of the present disclosure can be produced by dissolving magnesium borohydride in a sulfone.

Effects of the Invention

The present disclosure makes it possible to obtain an electrolytic solution that is produced using a sulfone, a non-ether solvent, is workable with a magnesium electrode, and allows a reversible electrochemical deposition/dissolution reaction of magnesium. In addition, the magnesium salt used includes magnesium borohydride ($Mg(BH_4)_2$), which contains no halogen atom. This eliminates the need for various components of electrochemical devices to be made of highly corrosion-resistant materials. Therefore, the use of this excellent electrolytic solution in an electrolyte layer makes it possible to achieve high-performance electrochemical devices such as high-performance magnesium batteries. It will be understood that the effects described herein are illustrative only and not intended to be limiting or exclude additional effects.

MODE FOR CARRYING OUT THE INVENTION

Hereinafter, the present disclosure will be described on the basis of examples with reference to the drawings. It will be understood that the examples are not intended to limit the present disclosure and various values and materials in the examples are by way of example only. Note that descriptions will be provided in the following order.

1. Description of general features of electrolytic solution and electrochemical device of the present disclosure
2. Example 1 (Electrolytic solution of the present disclosure)
3. Example 2 (Electrochemical device of the present disclosure)
4. Example 3 (Modifications of electrochemical device of the present disclosure)
5. Others <Description of General Features of Electrolytic Solution and Electrochemical Device of the Present Disclosure>

The electrolytic solution of the present disclosure and the electrolytic solution in the electrochemical device of the present disclosure are also collectively called the "electrolytic solution and the like of the present disclosure".

In the electrolytic solution and the like of the present disclosure, the sulfone may be an alkyl sulfone represented by $R_1R_2SO_2$ (wherein $R_1$ and $R_2$ each represent an alkyl group) or an alkyl sulfone derivative. The type of the $R_1$ and $R_2$ groups (the number of carbon atoms in the $R_1$ and $R_2$ groups and the combination of the $R_1$ and $R_2$ groups) is not limited and may be selected as needed. The number of carbon atoms in each of the $R_1$ and $R_2$ groups is preferably, but not limited to, 4 or less. In addition, the sum of the numbers of carbon atoms in the $R_1$ and $R_2$ groups is preferably, but not limited to, 4 to 7. $R_1$ and $R_2$ may each be, for example, methyl, ethyl, n-propyl, isopropyl, n-butyl, isobutyl, sec-butyl, or tert-butyl.

In this regard, specifically, the alkyl sulfone may be at least one alkyl sulfone selected from the group consisting of dimethyl sulfone (DMS), methyl ethyl sulfone (MES), methyl n-propyl sulfone (MnPS), methyl isopropyl sulfone (MiPS), methyl n-butyl sulfone (MnBS), methyl isobutyl sulfone (MiBS), methyl sec-butyl sulfone (MsBS), methyl tert-butyl sulfone (MtBS), ethyl methyl sulfone (EMS), diethyl sulfone (DES), ethyl n-propyl sulfone (EnPS), ethyl isopropyl sulfone (EiPS), ethyl n-butyl sulfone (EnBS), ethyl isobutyl sulfone (EiBS), ethyl sec-butyl sulfone (EsBS), ethyl tert-butyl sulfone (EtBS), di-n-propyl sulfone (DnPS), diisopropyl sulfone (DiPS), n-propyl n-butyl sulfone (nPnBS), n-butyl ethyl sulfone (nBES), isobutyl ethyl sulfone (iBES), sec-butyl ethyl sulfone (sBES), and di-n-butyl sulfone (DnBS). In addition, the alkyl sulfone derivative may be ethyl phenyl sulfone (EPhS).

The electrochemical device of the present disclosure including the above various preferred modes may be in the form of a battery (specifically, a primary or secondary battery) having an electrolyte layer including the electrolytic solution.

When the electrochemical device of the present disclosure is a battery (primary or secondary battery) having an electrolyte layer including the electrolytic solution of the present disclosure, the battery may have a negative electrode including magnesium, a magnesium alloy, or a magnesium compound. More specifically, the secondary battery may be a magnesium battery, an air battery, or a fuel battery. Alternatively, the electrochemical device of the present disclosure may be a capacitor, a sensor, or a magnesium ion filter.

In addition, when the electrochemical device of the present disclosure is a battery having an electrolyte layer including the electrolytic solution of the present disclosure, the battery may have a positive electrode including sulfur (S), graphite fluoride $((CF)_n)$, or an oxide or halide of any of various metals [such as scandium (Sc), titanium (Ti), vanadium (V), chromium (Cr), manganese (Mn), iron (Fe), cobalt (Co), nickel (Ni), copper (Cu), and zinc (Zn)] as a non-limiting example of a positive electrode active material. Further, as mentioned above, the material used to form the negative electrode may be, for example, elemental magnesium metal, a magnesium alloy, or a magnesium compound. As a non-limiting example, a sheet material or a foil material may be used to form the negative electrode. Alternatively, a powder may also be used to form (shape) the negative electrode.

When the electrochemical device of the present disclosure is a battery (primary or secondary battery) having an electrolyte layer including the electrolytic solution of the present disclosure, the battery may be used, for example, as a drive power source or an auxiliary power source for notebook personal computers, personal digital assistants (PDAs), cellular phones, smart phones, base and extension units for codeless phones, video cameras, digital still cameras, digital books, electronic dictionaries, portable music players, radios, headphones, game machines, navigation systems, memory cards, cardiac pacemakers, hearing aids, electric tools, electric shavers, refrigerators, air conditioners, TV receivers, stereos, water heaters, microwave ovens, dishwashers, washing machines, drying machines, lighting devices, toys, medical instruments, robots, road conditioners, traffic signals, railway vehicles, golf carts, electric carts, and electric cars (including hybrid cars). The battery may also be installed in power storage sources for buildings such as houses or power generation facilities or may be used to supply power thereto. In electric cars, motors are generally used as converters for receiving electric power and converting the electric power to mechanical drive power. Control devices for processing information about vehicle control include control devices for displaying remaining battery power on the basis of the information about the remaining battery power. The battery may also be used as an electrical storage device in what are called smart grids. Such an electrical storage device can not only supply power but also store power by receiving power from other power sources. Examples of other power sources that may be used include, for example, thermal power generators, nuclear power generators, hydroelectric power generators, solar batteries, wind power generators, geothermal power generators, and fuel cells (including biofuel cells).

A battery pack may be provided, including a secondary batter, a control unit configured to perform control for the secondary battery, and a casing configured to contain the secondary battery. The electrochemical device of the present disclosure including the above various preferred modes may be used as the secondary battery in the battery pack. In the battery pack, the control unit is configured, for example, to control the charge and discharge, over discharge, or overcharge of the secondary battery.

An electronic device may be provided, which is configured to receive electric power from a secondary battery. The electrochemical device of the present disclosure including the above various preferred modes may be used as the secondary battery in the electronic device.

An electric vehicle may be provided, including: a converter configured to receive electric power from a secondary battery and convert the electric power to mechanical drive power for the vehicle; and a control device configured to process information about vehicle control on the basis of information about the secondary battery. The electrochemical device of the present disclosure including the above various preferred modes may be used as the secondary battery in the electric vehicle. In the electric vehicle, the converter is typically configured to receive electric power from the secondary battery and to drive a motor that generates mechanical drive power. Regenerative energy may also be used to drive the motor. The control device is configured, for example, to process information about vehicle control on the basis of the remaining power of the secondary battery. Examples of the electric vehicle include electric cars, electric motorcycles, electric bicycles, railway vehicles, and so-called hybrid cars.

A power system may be provided, which is configured to receive electric power from a secondary battery and/or to supply electric power from a power source to the secondary battery. The electrochemical device of the present disclosure including the above various preferred modes may be used as the secondary battery in the power system. The power system may be of any type for use of electric power, which also includes simple power devices. Examples of the power system include smart grids, home energy management systems (HEMSs), and vehicles, which can also store electricity.

A power source for use in power storage may be provided, which includes a secondary battery and is configured to be connected to an electronic device to which electric power is to be supplied. The electrochemical device of the present disclosure including the above various preferred modes may be used as the secondary battery in the power source. The power source for use in power storage may be used in any applications. Basically, the power source may be used in any power systems or devices, and may also be used, for example, in smart grids.

Alternatively, the electrolytic solution of the present disclosure including the preferred modes described above may be used as a plating bath. Specifically, the electrolytic solution of the present disclosure including the preferred modes described above may be used as a plating bath, in which, for example, a plate- or rod-shaped elemental magnesium metal may be used as an anode (counter electrode), and, for example, platinum (Pt) or a platinum alloy, nickel (Ni) or a nickel alloy, or a stainless steel may be used as a material to be plated, which forms a cathode (working electrode).

Example 1

Example 1 relates to the electrolytic solution of the present disclosure. The electrolytic solution of Example 1 includes a sulfone and a magnesium salt dissolved in the sulfone, wherein the magnesium salt includes magnesium borohydride ($Mg(BH_4)_2$). The electrolytic solution of Example 1 with such features can be produced by dissolving magnesium borohydride ($Mg(BH_4)_2$) in a sulfone. Note that, in Example 1, the sulfone includes an alkyl sulfone represented by $R_1R_2SO_2$ (wherein $R_1$ and $R_2$ each represent an alkyl group), specifically, ethyl n-propyl sulfone (EnPS).

Specifically, the electrolytic solution of Example 1 is a magnesium ion-containing nonaqueous electrolytic solution that is for use in electrochemical devices and includes a solvent including a sulfone and a magnesium salt dissolved in the solvent. In the electrolytic solution, the molar ratio of the sulfone to the magnesium salt is, for example, but not limited to, 50 to 150, typically 60 to 120, preferably 65 to 75.

The electrolytic solution of Example 1 was produced by the method described below. Note that, in the method, the weighing and mixing of reagents were performed in a glove box (Ar gas atmosphere with a dew point of −80° C. to −90° C.). Specifically, 49 milligrams of magnesium borohydride ($Mg(BH_4)_2$) was added as a solvent to 5 milliliters of EnPS being stirred with a stirrer. The magnesium borohydride was dissolved in the sulfone by stirring with the stirrer for 90 minutes. Filtration (pore size 0.45 μm) was then performed to remove the undissolved magnesium borohydride.

In Comparative Example 1, 1,2-dimethoxyethane (DME) was used as a solvent instead of the sulfone. Specifically, 49 milligrams of magnesium borohydride was added to 5 milliliters of 1,2-dimethoxyethane being stirred with a stirrer. The magnesium borohydride was dissolved in the DME by stirring with the stirrer for 90 minutes. Filtration (pore size 0.45 μm) was then performed to remove the undissolved magnesium borohydride.

The electrolytic solutions of Example 1 and Comparative Example 1 were subjected to cyclic voltammetry (CV) measurement for the evaluation of the electrochemical properties of the electrolytic solutions. The measurement was performed using a three-electrode cell (with a volume of electrolytic solution of 1 milliliter), in which a platinum (Pt) electrode (1.6 mm in diameter) was used as the working electrode while magnesium (Mg) wires (1.6 mm in diameter) were used as the counter and reference electrodes. The measurement was performed in a glove box (Ar gas atmosphere with a dew point of −80° C. to −90° C.) at room temperature.

The first cycle of the measurement was started from the open circuit voltage (OCV). The potential of the working electrode relative to the potential of the reference electrode was first decreased to about −1.5 volts on the reduction side, then increased to about +2.0 volts on the oxidation side, and finally returned to the OCV (namely, the potential was changed in the following order: OCV, about −1.5 volts, about +2.0 volts, OCV). The potential sweep rate was millivolts/second.

Figure 1A:
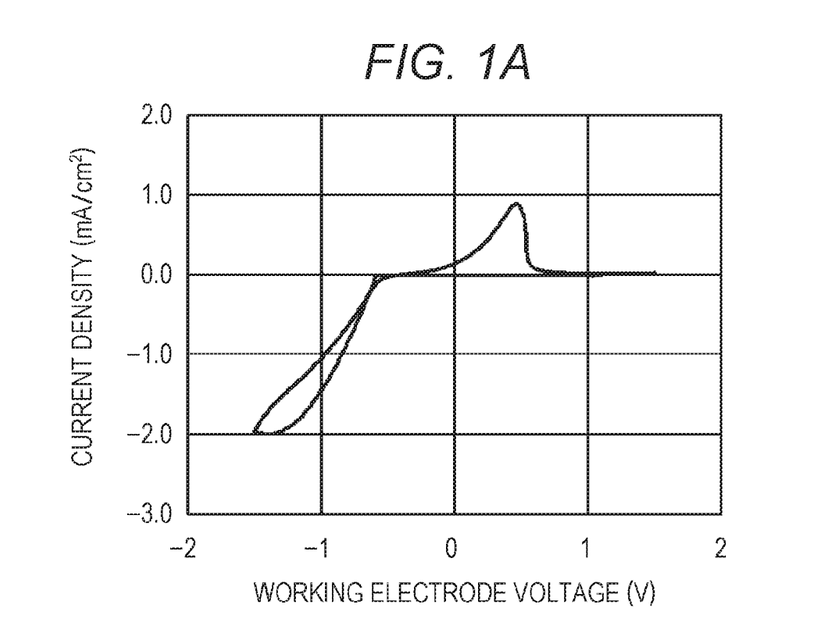
FIGS. 1A and 1B are graphs showing the results of CV measurement of an electrolytic solution of Example 1.
Figure 1B:
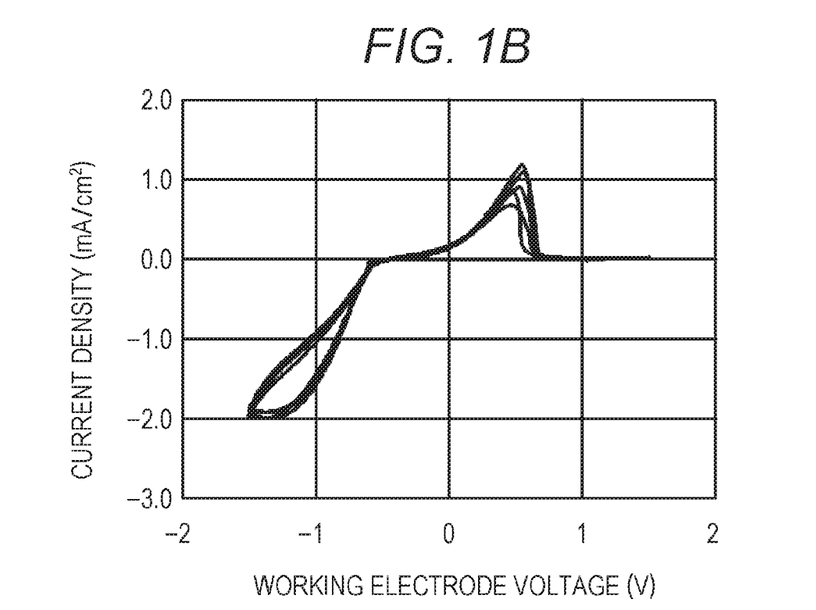
Figure 2:
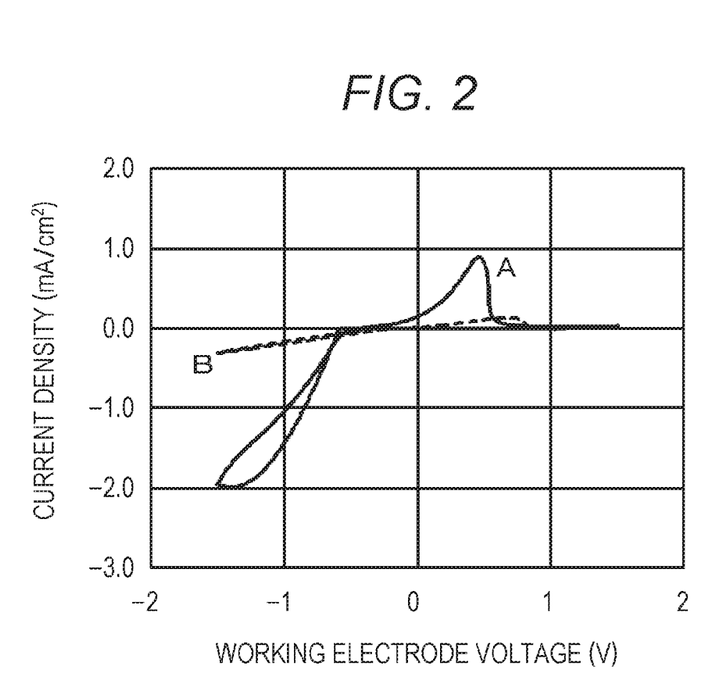
FIG. 2 is a graph showing a comparison between the results of CV measurement of electrolytic solutions of Example 1 and Comparative Example 1.

FIGS. 1A and 1B are graphs showing the results of CV measurement of the electrolytic solution of Example 1, and FIG. 2 is a graph showing a comparison between the results of CV measurement of the electrolytic solutions of Example 1 and Comparative Example 1. The horizontal axis represents the potential of the working electrode relative to that of the reference electrode. In addition, in FIG. 2, "A" indicates the results of Example 1, and "B" indicates the results of Comparative Example 1. Note that FIG. 1A is a graph showing the results of the first cycle of CV measurement of the electrolytic solution of Example 1, and FIG. 1B is a graph showing together the results of the first to fifth cycles of CV measurement of the electrolytic solution of Example 1. FIGS. 1A and 1B show that an electrolytic solution capable of reversibly dissolving and depositing magnesium (Mg) has been successfully synthesized using only magnesium borohydride and EnPS as components. FIG. 1B also shows that the potential at which the deposition and dissolution of magnesium starts does not change even as the cycle number increases. In addition, the results of the measurement of Example 1 and Comparative Example 1 in FIG. 2 show that the observed current value is larger when EnPS is used as the solvent than when DME is used.

As described above, Example 1 demonstrates that the use of a sulfone, a non-ether solvent, makes it possible to obtain a magnesium ion-containing nonaqueous electrolytic solution that works with a magnesium electrode and enables a reversible electrochemical deposition/dissolution reaction of magnesium at room temperature. In addition, the magnesium salt used is magnesium borohydride ($Mg(BH_4)_2$), which contains no halogen atom. This eliminates the need for various components of electrochemical devices to be made of highly corrosion-resistant materials. In addition, this electrolytic solution is easy to handle because it is produced using a sulfone as a solvent, which has a high boiling point, low volatility (low vapor pressure), and high safety as compared with an ether solvent such as THF. This makes it possible to significantly simplify the process for manufacturing, for example, magnesium batteries. This electrolytic solution also has a potential window wider than that of a conventional electrolytic solution produced using THF as a solvent. This widens the choice of positive electrode materials for magnesium batteries and thus makes it possible to improve the voltage of achievable secondary batteries, namely, the energy density of achievable secondary batteries. In addition, this electrolytic solution itself can be significantly reduced in cost because of its simple composition. Further, the use of this excellent electrolytic solution in an electrolyte layer makes it possible to obtain high-performance electrochemical devices such as high-performance magnesium batteries.

For example, dimethyl sulfone has a vapor pressure of 102 Pa at 25° C. Therefore, dimethyl sulfone is also industrially easy to handle. In contrast, for example, tetrahydrofuran (THF) has a vapor pressure of 21.6 kPa at 25° C. The use of a low-vapor-pressure solvent such as a sulfone is also very advantageous in terms of manufacturing facility running costs.

Example 2

Figure 3:
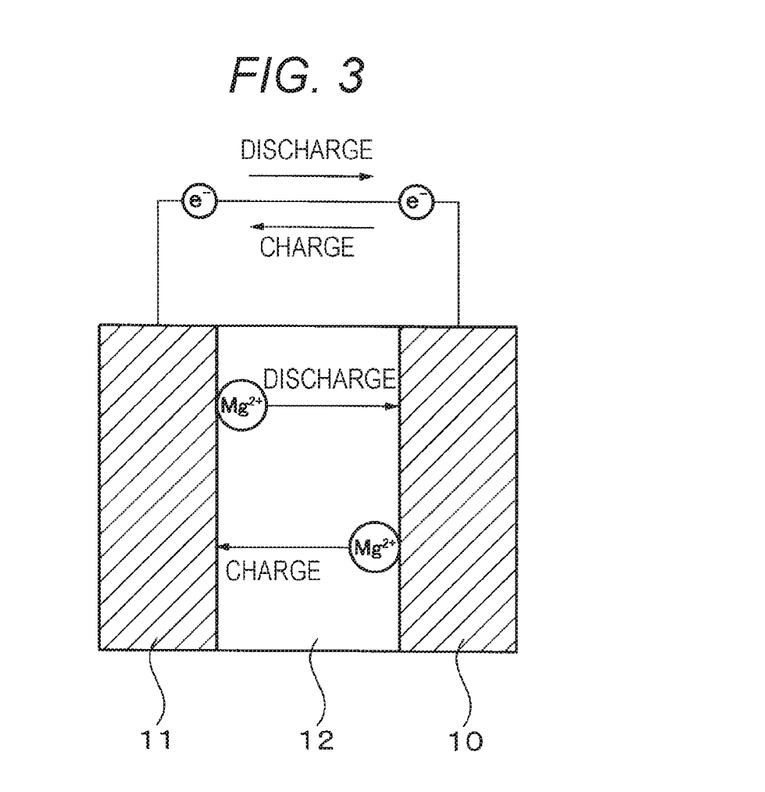
FIG. 3 is a schematic diagram of an electrochemical device (battery) of Example 2.

Example 2 relates to the electrochemical device of the present disclosure. Specifically, the electrochemical device of Example 2 includes the electrolytic solution of the present disclosure, specifically the electrolytic solution of Example 1. The electrochemical device of Example 2 is specifically a battery (specifically a primary or secondary battery, more specifically a primary or secondary battery having a negative electrode including magnesium) having an electrolyte layer including the electrolytic solution of Example 1. FIG. 3 is a schematic diagram showing the battery of Example 2. The battery constituting the electrochemical device of Example 2 has a structure including a positive electrode 10, a negative electrode 11, and an electrolyte layer 12 including the electrolytic solution of Example 1, in which the positive and negative electrodes 10 and 11 are opposite to each other with the electrolyte layer 12 in between.

This battery may be used to form a magnesium secondary battery, which stores electric power by converting electric energy into chemical energy through the transfer of magnesium ions ($Mg^{2+}$) from the positive electrode 10 to the negative electrode 11 via the electrolyte layer 12 during charging. During discharging, the magnesium secondary battery generates electric energy by allowing magnesium ions to return from the negative electrode 11 to the positive electrode 10 via the electrolyte layer 12.

Figure 4:
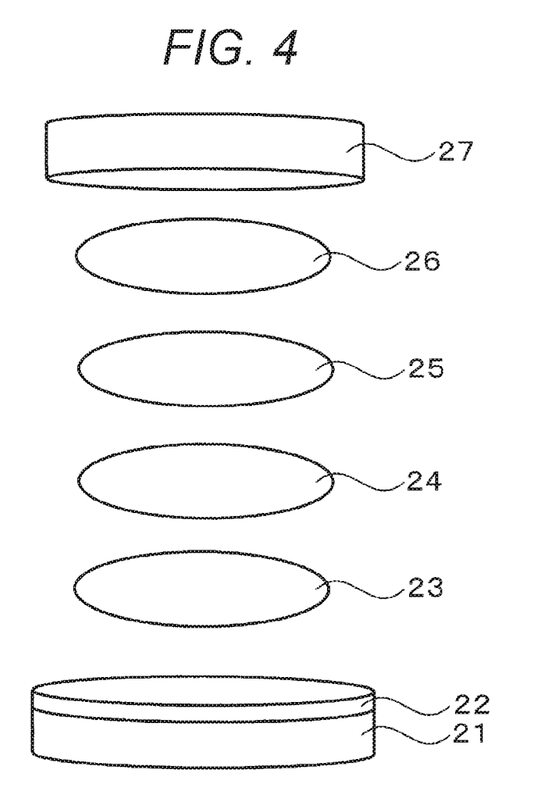
FIG. 4 is a schematic exploded view of an electrochemical device (battery) of Example 2.

Specifically, a coin battery was prepared, having a magnesium (Mg) negative electrode and a sulfur (S) positive electrode. FIG. 4 is a schematic diagram showing an exploded state of the coin battery. A gasket 22 was placed on a coin battery case 21, on which a positive electrode 23 including sulfur, a glass fiber separator 24, a negative electrode 25 made of a 0.25-μm-thick Mg sheet, a spacer 26 made of a 0.5-μm-thick stainless steel sheet, and a coin battery cap 27 were stacked in this order and then sealed inside by crimping the coin battery case 21. The spacer 26 was spot-welded to the coin battery cap 27 in advance. The separator 24 contained the electrolytic solution of Example 1.

Example 3

Figure 5:
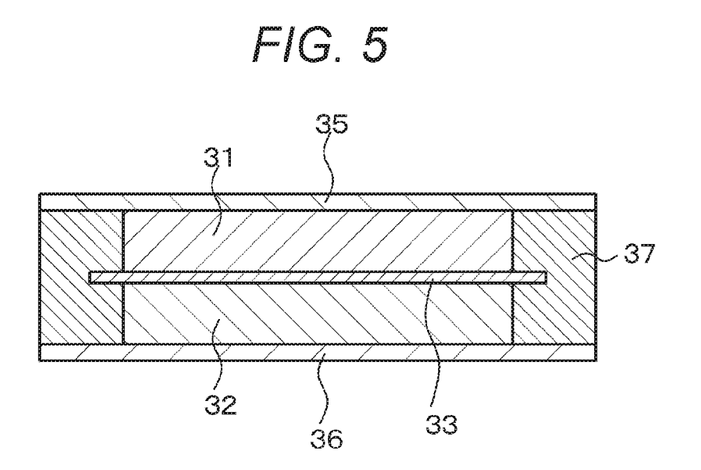
FIG. 5 is a schematic cross-sectional view of an electrochemical device (capacitor) of Example 3.

Example 3 is a modification of Example 2. As shown in the schematic cross-sectional view of FIG. 5, the electrochemical device of Example 3 includes a capacitor including a positive electrode 31, a negative electrode 32, and a separator 33 impregnated with the electrolytic solution of Example 1, in which the positive and negative electrodes 31 and 32 are opposite to each other with the separator 33 in between. Note that a gel electrolyte membrane impregnated with the electrolytic solution of Example 1 may also be disposed on the surface of at least one of the separator 33, the positive electrode 31, and the negative electrode 32. Reference numerals 35 and 36 each represent a collector, and reference numeral 37 represents a gasket.

Figure 6:
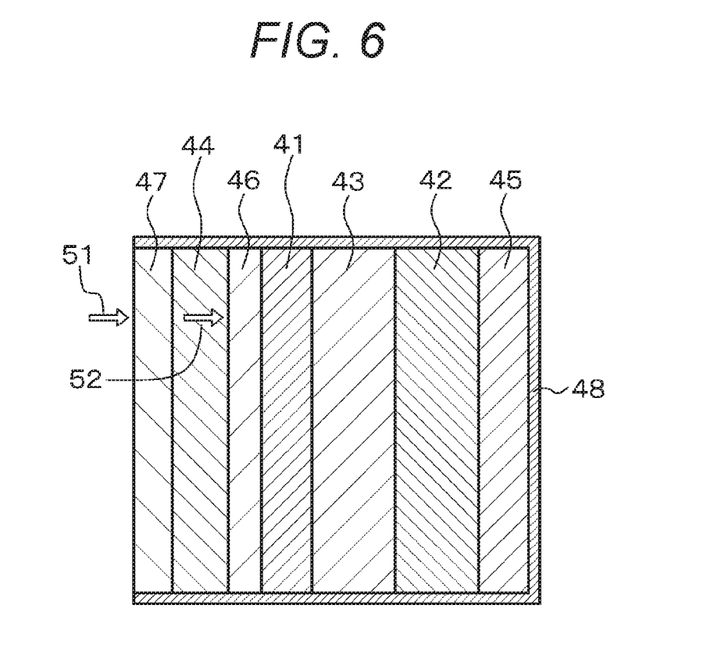
FIG. 6 is a schematic diagram of an electrochemical device (air battery) of Example 3.

Alternatively, the electrochemical device of Example 3 includes an air battery as shown in the schematic diagram of FIG. 6. The air battery includes, for example, a selectively oxygen-permeable membrane 47 that is less permeable to water vapor and selectively permeable to oxygen; an air electrode-side collector 44 including a conductive porous material; a porous diffusion layer 46 disposed between the air electrode-side collector 44 and a porous positive electrode 41 and including a conductive material; the porous positive electrode 41 including a conductive material and a catalytic material; a part 43 composed of a separator less permeable to water vapor and an electrolytic solution (or a solid electrolyte containing an electrolytic solution); a negative electrode 42 capable of releasing magnesium ions; a negative electrode-side collector 45; and an outer case 48 in which these layers are housed.

Oxygen 52 in the air (atmosphere) 51 is selectively permeated through the selectively oxygen-permeable membrane 47, allowed to pass through the air electrode-side collector 44 including a porous material, diffused by the diffusion layer 46, and supplied to the porous positive electrode 41. The movement of the oxygen passing through the selectively oxygen-permeable membrane 47 is partially blocked by the air electrode-side collector 44. However, the oxygen passing through the air electrode-side collector 44 is diffused and spread by the diffusion layer 46, so that the oxygen is efficiently supplied throughout the whole of the porous positive electrode 41. Therefore, the air electrode-side collector 44 is prevented from interfering with the supply of oxygen to the entire surface of the porous positive electrode 41. In addition, the selectively oxygen-permeable membrane 47 resists permeation of water vapor. Therefore, the effect of water in the air is less likely to cause degradation, and oxygen is efficiently supplied to the whole of the porous positive electrode 41, which makes it possible to increase the battery power and to make the battery stably usable for a long period of time.

Figure 7:
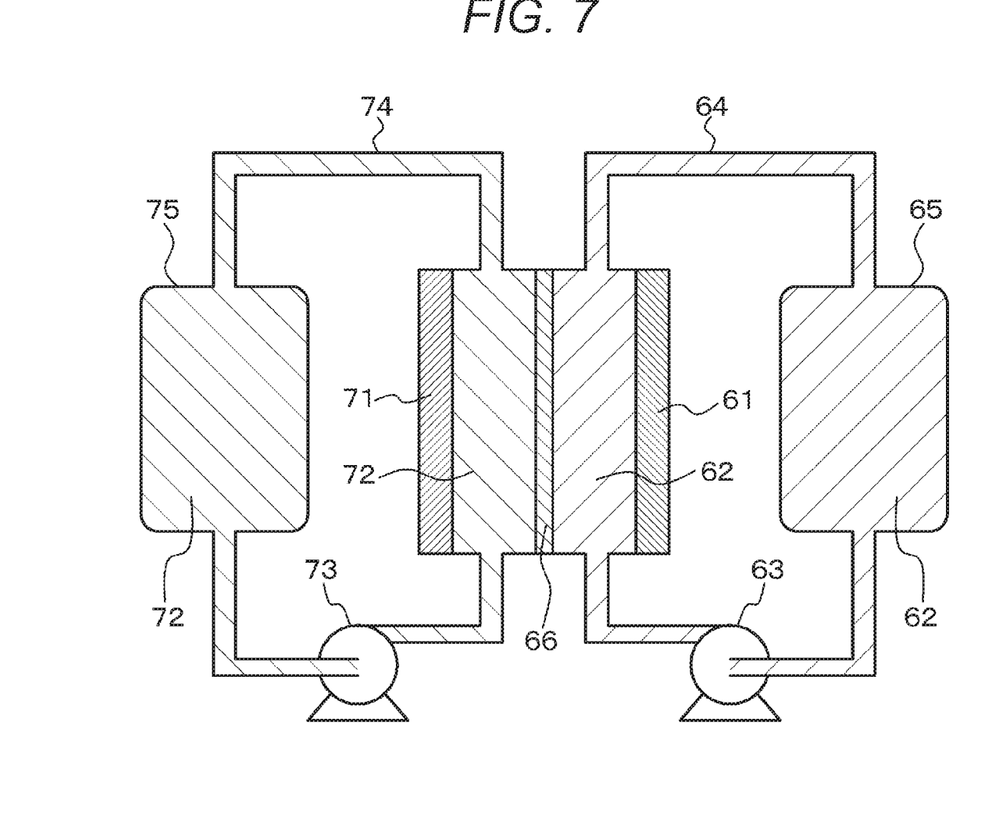
FIG. 7 is a schematic diagram of an electrochemical device (fuel battery) of Example 3.

Alternatively, the electrochemical device of Example 3 includes a fuel battery as shown in the schematic diagram of FIG. 7. The fuel battery includes, for example, a positive electrode 61, an electrolytic solution 62 for the positive electrode, a pump 63 for feeding the electrolytic solution for the positive electrode, a fuel passage 64, a vessel 65 for storing the electrolytic solution for the positive electrode, a negative electrode 71, an electrolytic solution 72 for the negative electrode, a pump 73 for feeding the electrolytic solution for the negative electrode, a fuel passage 74, a vessel 75 for storing the electrolytic solution for the negative electrode, and an ion-exchange membrane 66. The electrolytic solution 62 for the positive electrode is allowed to flow (circulated) continuously or intermittently into the fuel passage 64 through the vessel 65 for storing the electrolytic solution for the positive electrode and the pump 63 for feeding the electrolytic solution for the positive electrode. The electrolytic solution 72 for the negative electrode is allowed to flow (circulated) continuously or intermittently into the fuel passage 74 through the vessel 75 for storing the electrolytic solution for the negative electrode and the pump 73 for feeding the electrolytic solution for the negative electrode. Electric power is generated between the positive electrode 61 and the negative electrode 71. A material obtained by adding a positive electrode active material to the electrolytic solution of Example 1 may be used as the electrolytic solution 62 for the positive electrode. A material obtained by adding a negative electrode active material to the electrolytic solution of Example 1 may be used as the electrolytic solution 72 for the negative electrode.

The present disclosure has been described on the basis of preferred examples. It will be understood that such examples are not intended to limit the present disclosure. Although shown in the examples, the composition of the electrolytic solution, the raw materials used in the production, the production method, the production conditions, the properties of the electrolytic solution, and the configuration and structure of the electrochemical devices and batteries are non-limiting and illustrative only and may be modified as appropriate. A mixture of the electrolytic solution of the present disclosure and an organic polymer (such as polyethylene oxide, polyacrylonitrile, or PVDF) may also be used as a gel electrolyte.

The electrolytic solution described in Example 1 may be used as a magnesium electroplating bath. Note that the magnesium salt in the magnesium electroplating bath is not limited to magnesium borohydride and may also be, for example, at least one selected from the group consisting of magnesium chloride ($MgCl_2$), magnesium bromide ($MgBr_2$), magnesium iodide ($MgI_2$), magnesium perchlorate ($Mg(ClO_4)_2$), magnesium tetrafluoroborate ($Mg(BF_4)_2$), magnesium hexafluorophosphate ($Mg(PF_6)_2$), magnesium hexafluoroarsenate ($Mg(AsF_6)_2$), magnesium perfluoroalkylsulfonate ($Mg(R_{f1}SO_3)_2$), wherein $R_{f1}$ is a perfluoroalkyl group, magnesium tetraphenylborate ($Mg(B(C_6H_5)_4)_2$), and magnesium perfluoroalkylsulfonylimidate ($Mg((R_{f2}SO_2)_2N)_2$), wherein $R_{f2}$ is a perfluoroalkyl group. In addition, in this case, $MgX_2$ (X=Cl, Br, or I) is particularly preferred among these magnesium salts. Further, such a plating bath can be obtained by dissolving the magnesium salt in a low-boiling-point solvent capable of dissolving the magnesium salt, then dissolving a sulfone in the solution of the magnesium salt in the low-boiling-point solvent, and then removing the low-boiling-point solvent from the sulfone solution.

The low-boiling-point solvent capable of dissolving the magnesium salt may be basically any solvent capable of dissolving the magnesium salt and having a boiling point lower than that of the sulfone selected. Preferably, an alcohol is used as the low-boiling-point solvent. Such an alcohol may be a monohydric or polyhydric alcohol and may be a saturated or unsaturated alcohol. Specifically, such an alcohol may be, but not limited to, methanol, ethanol, 1-propanol, 2-propanol (isopropanol), 1-butanol, 2-butanol (sec-butanol), 2-methyl-1-propanol (isobutanol), 2-methyl-2-propanol (tert-butanol), or 1-pentanol.

The plating bath described above may also contain an additive. The additive may include a salt having a metal ion including a cation of at least one atom or atomic group selected from the group consisting of aluminum (Al), beryllium (Be), boron (B), gallium (Ga), indium (In), silicon (Si), tin (Sn), titanium (Ti), chromium (Cr), iron (Fe), cobalt (Co), and lanthanum (La). Alternatively, the additive may include a salt including at least one atom, organic group, or anion selected from the group consisting of hydrogen, an alkyl group, an alkenyl group, an aryl group, a benzyl group, an amide group, a fluoride ion ($F^-$), a chloride ion ($Cl^-$), a bromide ion ($Br^-$), an iodide ion ($I^-$), a perchlorate ion ($ClO_4^-$), a tetrafluoroborate ion ($BF_4^-$), a hexafluorophosphate ion ($PF_6^-$), a hexafluoroarsenate ion ($AsF^-$), a perfluoroalkylsulfonate ion ($R_{f1}SO_3^-$), wherein $R_{f1}$ is a perfluoroalkyl group, and a perfluoroalkylsulfonylimide ion ($(R_{f2}SO_2)_2N^-$), wherein $R_{f2}$ is a perfluoroalkyl group. The addition of such an additive can increase the ionic conductivity of the plating bath.

In addition, in another mode, the plating bath described above may further contain a nonpolar solvent. Namely, a nonpolar solvent may be mixed into the plating bath. The nonpolar solvent can function as a kind of diluent. In this case, the dielectric constant and donor number of the nonpolar solvent are each preferably 20 or less. The nonpolar solvent may be at least one nonpolar solvent selected from the group consisting of an aromatic hydrocarbon, an ether, a ketone, an ester, and a chain carbonate ester. Specifically, the aromatic hydrocarbon may be, for example, toluene, benzene, o-xylene, m-xylene, p-xylene, or 1-methylnaphthalene, and the ether may be, for example, diethyl ether or tetrahydrofuran. The ketone may be, for example, 4-methyl-2-pentanone. The ester may be, for example, methyl acetate or ethyl acetate. The chain carbonate ester may be, for example, dimethyl carbonate, diethyl carbonate, or ethylmethyl carbonate.

Note that the present disclosure may also have the following configurations.

[A01]<<Electrolytic Solution>>

An electrolytic solution including: a sulfone; and a magnesium salt dissolved in the sulfone, the magnesium salt including magnesium borohydride.

[A02] The electrolytic solution according to [A01], wherein the sulfone is an alkyl sulfone represented by $R_1R_2SO_2$, wherein $R_1$ and $R_2$ each represent an alkyl group, or an alkyl sulfone derivative.

[A03] The electrolytic solution according to [A02], wherein the alkyl sulfone is at least one alkyl sulfone selected from the group consisting of dimethyl sulfone, methyl ethyl sulfone, methyl n-propyl sulfone, methyl isopropyl sulfone, methyl n-butyl sulfone, methyl isobutyl sulfone, methyl sec-butyl sulfone, methyl tert-butyl sulfone, ethyl methyl sulfone, diethyl sulfone, ethyl n-propyl sulfone, ethyl isopropyl sulfone, ethyl n-butyl sulfone, ethyl isobutyl sulfone, ethyl sec-butyl sulfone, ethyl tert-butyl sulfone, di-n-propyl sulfone, diisopropyl sulfone, n-propyl n-butyl sulfone, n-butyl ethyl sulfone, isobutyl ethyl sulfone, sec-butyl ethyl sulfone, and di-n-butyl sulfone, and the alkyl sulfone derivative is ethyl phenyl sulfone.

[B01]<<Electrochemical Device>>

An electrochemical device including an electrolytic solution, the electrolytic solution including a sulfone and a magnesium salt dissolved in the sulfone, the magnesium salt including magnesium borohydride.

[B02] The electrochemical device according to [B01], wherein the sulfone is an alkyl sulfone represented by $R_1R_2SO_2$, wherein $R_1$ and $R_2$ each represent an alkyl group, or an alkyl sulfone derivative.

[B03] The electrochemical device according to [B02], wherein the alkyl sulfone is at least one alkyl sulfone selected from the group consisting of dimethyl sulfone, methyl ethyl sulfone, methyl n-propyl sulfone, methyl isopropyl sulfone, methyl n-butyl sulfone, methyl isobutyl sulfone, methyl sec-butyl sulfone, methyl tert-butyl sulfone, ethyl methyl sulfone, diethyl sulfone, ethyl n-propyl sulfone, ethyl isopropyl sulfone, ethyl n-butyl sulfone, ethyl isobutyl sulfone, ethyl sec-butyl sulfone, ethyl tert-butyl sulfone, di-n-propyl sulfone, diisopropyl sulfone, n-propyl n-butyl sulfone, n-butyl ethyl sulfone, isobutyl ethyl sulfone, sec-butyl ethyl sulfone, and di-n-butyl sulfone, and
the alkyl sulfone derivative is ethyl phenyl sulfone.

[B04] The electrochemical device according to any one of [B01] to [B03], which is a battery having an electrolyte layer including the electrolytic solution.

[B05] The electrochemical device according to [B04], wherein the battery is a primary battery or a secondary battery.

[B06] The electrochemical device according to [B05], wherein the battery has a negative electrode including magnesium, a magnesium alloy, or a magnesium compound.

[B07] The electrochemical device according to [B06], further including a positive electrode including sulfur, graphite fluoride, a metal oxide, or a metal halide as a positive electrode active material.

[B08] The electrochemical device according to [B07], wherein the metal in the metal oxide or the metal halide is scandium, titanium, vanadium, chromium, manganese, iron, cobalt, nickel, copper, or zinc.

[B09] The electrochemical device according to anyone of [B04] to [B08], wherein the battery includes a magnesium battery, an air battery, or a fuel battery.

[B10] The electrochemical device according to any one of [B01] to [B03], which includes a capacitor.

[B11] The electrochemical device according to [B10], wherein the capacitor includes a positive electrode, a negative electrode, and a separator sandwiched between the positive and negative electrodes and impregnated with the electrolytic solution.

[B12] The electrochemical device according to any one of [B01] to [B03], which includes a sensor or a magnesium ion filter.

[C01] A secondary battery including an electrolyte layer including an electrolytic solution,
the electrolytic solution including a sulfone and a magnesium salt dissolved in the sulfone,
the magnesium salt including magnesium borohydride.

[C02] The secondary battery according to [C01], wherein the sulfone is an alkyl sulfone represented by $R_1R_2SO_2$, wherein $R_1$ and $R_2$ each represent an alkyl group, or an alkyl sulfone derivative.

[C03] The secondary battery according to [C02], wherein the alkyl sulfone is at least one alkyl sulfone selected from the group consisting of dimethyl sulfone, methyl ethyl sulfone, methyl n-propyl sulfone, methyl isopropyl sulfone, methyl n-butyl sulfone, methyl isobutyl sulfone, methyl sec-butyl sulfone, methyl tert-butyl sulfone, ethyl methyl sulfone, diethyl sulfone, ethyl n-propyl sulfone, ethyl isopropyl sulfone, ethyl n-butyl sulfone, ethyl isobutyl sulfone, ethyl sec-butyl sulfone, ethyl tert-butyl sulfone, di-n-propyl sulfone, diisopropyl sulfone, n-propyl n-butyl sulfone, n-butyl ethyl sulfone, isobutyl ethyl sulfone, sec-butyl ethyl sulfone, and di-n-butyl sulfone, and
the alkyl sulfone derivative is ethyl phenyl sulfone.

[C04] The secondary battery according to any one of [C01] to [C03], further including a negative electrode including magnesium, a magnesium alloy, or a magnesium compound.

[C05] The secondary battery according to any one of [C01] to [C04], further including a positive electrode including sulfur, graphite fluoride, a metal oxide, or a metal halide as a positive electrode active material.

[C06] The secondary battery according to [C05], wherein the metal in the metal oxide or the metal halide is scandium, titanium, vanadium, chromium, manganese, iron, cobalt, nickel, copper, or zinc.

[D01] A battery pack including: a secondary batter; a control unit configured to perform control for the secondary battery; and a casing configured to contain the secondary battery, wherein
the secondary battery is the secondary battery according to any one of [C01] to [C06].

[D02] An electronic device configured to receive electric power from a secondary battery, wherein
the secondary battery is the secondary battery according to any one of [C01] to [C06].

[D03] An electric vehicle including: a converter configured to receive electric power from a secondary battery and convert the electric power to mechanical drive power for the vehicle; and a control device configured to process information about vehicle control on the basis of information about the secondary battery, wherein
the secondary battery is the secondary battery according to any one of [C01] to [C06].

[D04] A power system configured to receive electric power from a secondary battery and/or to supply electric power from a power source to the secondary battery, wherein
the secondary battery is the secondary battery according to any one of [C01] to [C06].

[D05] A power source for use in power storage, the power source including a secondary battery and being configured to be connected to an electronic device to which electric power is to be supplied, wherein
the secondary battery is the secondary battery according to any one of [C01] to [C06].

[E01]<<Method for Producing Electrolytic Solution>>
A method for producing an electrolytic solution, the method including dissolving magnesium borohydride in a sulfone to form an electrolytic solution.

[F01]<<Plating Bath>>
A plating bath including: a sulfone; and a magnesium salt dissolved in the sulfone,
the magnesium salt including magnesium borohydride.

[F02]<<Plating Bath>>
A plating bath including: a sulfone; and a magnesium salt dissolved in the sulfone, the magnesium salt being at least one magnesium salt selected from the group consisting of magnesium chloride, magnesium bromide, magnesium iodide, magnesium perchlorate, magnesium tetrafluoroborate, magnesium hexafluorophosphate, magnesium hexafluoroarsenate, magnesium perfluoroalkylsulfonate, magnesium tetraphenylborate, and magnesium perfluoroalkylsulfonylimidate.

[F03] The plating bath according to [F01] or [F02], wherein the sulfone is an alkyl sulfone represented by $R_1R_2SO_2$, wherein $R_1$ and $R_2$ each represent an alkyl group, or an alkyl sulfone derivative.

[F04] The plating bath according to [F03], wherein the alkyl sulfone is at least one alkyl sulfone selected from the group consisting of dimethyl sulfone, methyl ethyl sulfone, methyl n-propyl sulfone, methyl isopropyl sulfone, methyl n-butyl sulfone, methyl isobutyl sulfone, methyl sec-butyl sulfone, methyl tert-butyl sulfone, ethyl methyl sulfone, diethyl sulfone, ethyl n-propyl sulfone, ethyl isopropyl sulfone, ethyl n-butyl sulfone, ethyl isobutyl sulfone, ethyl sec-butyl sulfone, ethyl tert-butyl sulfone, di-n-propyl sulfone, diisopropyl sulfone, n-propyl n-butyl sulfone, n-butyl ethyl sulfone, isobutyl ethyl sulfone, sec-butyl ethyl sulfone, and di-n-butyl sulfone, and the alkyl sulfone derivative is ethyl phenyl sulfone.

[F05] The plating bath according to any one of [F01] to [F04], further including an additive.

[F06] The plating bath according to [F05], wherein the additive includes a salt having a metal ion including a cation of at least one atom or atomic group selected from the group consisting of aluminum (Al), beryllium (Be), boron (B), gallium (Ga), indium (In), silicon (Si), tin (Sn), titanium (Ti), chromium (Cr), iron (Fe), cobalt (Co), and lanthanum (La), or the additive includes a salt including at least one atom, organic group, or anion selected from the group consisting of hydrogen, an alkyl group, an alkenyl group, an aryl group, a benzyl group, an amide group, a fluoride ion ($F^-$), a chloride ion ($Cl^-$), a bromide ion ($Br^-$), an iodide ion ($I^-$), a perchlorate ion ($ClO_4^-$), a tetrafluoroborate ion ($BF_4^-$), a hexafluorophosphate ion ($PF_6^-$), a hexafluoroarsenate ion ($AsF_6^-$), a perfluoroalkylsulfonate ion ($R_{f1}SO_3^-$), wherein $R_{f1}$ is a perfluoroalkyl group, and a perfluoroalkylsulfonylimide ion ($R_{f2}SO_2)_2N^-$, wherein $R_{f2}$ is a perfluoroalkyl group.

[F07] The plating bath according to any one of [F01] to [F06], further including a nonpolar solvent.

[F08] The plating bath according to [F07], wherein the nonpolar solvent has a dielectric constant of 20 or less and a donor number of 20 or less.

[F09] The plating bath according to [F07] or [F08], wherein the nonpolar solvent includes at least one nonpolar solvent selected from the group consisting of an aromatic hydrocarbon, an ether, a ketone, an ester, and a chain carbonate ester.

[F10] The plating bath according to [F09], wherein the aromatic hydrocarbon is toluene, benzene, o-xylene, m-xylene, p-xylene, or 1-methylnaphthalene, the ether is diethyl ether or tetrahydrofuran, the ketone is 4-methyl-2-pentanone, the ester is methyl acetate or ethyl acetate, and the chain carbonate ester is dimethyl carbonate, diethyl carbonate, or ethylmethyl carbonate.

[G01]<<Method for Producing Plating Bath>>

A method for producing a plating bath, the method including dissolving magnesium borohydride in a sulfone to form a plating bath.

[G02]<<Method for Producing Plating Bath>>

A method for producing a plating bath, the method including the steps of:

dissolving a magnesium salt in a low-boiling-point solvent capable of dissolving the magnesium salt;

then dissolving a sulfone in the solution of the magnesium salt in the low-boiling-point solvent; and then removing the low-boiling-point solvent from the sulfone solution, wherein the magnesium salt is at least one magnesium salt selected from the group consisting of magnesium chloride, magnesium bromide, magnesium iodide, magnesium perchlorate, magnesium tetrafluoroborate, magnesium hexafluorophosphate, magnesium hexafluoroarsenate, magnesium perfluoroalkylsulfonate, magnesium tetraphenylborate, and magnesium perfluoroalkylsulfonylimidate.

[G03] The method according to [G02] for producing a plating bath, the method further including adding a nonpolar solvent to a product obtained after removing the low-boiling-point solvent from the sulfone solution.

REFERENCE SIGNS LIST

10 Positive electrode
11 Negative electrode
12 Electrolyte layer
21 Coin battery case
22 Gasket
23 Positive electrode
24 Separator
25 Negative electrode
26 Spacer
27 Coin battery cap
31 Positive electrode
32 Negative electrode
33 Separator
35, 36 Collector
37 Gasket
41 Porous positive electrode
42 Negative electrode
43 Separator and electrolytic solution
44 Air electrode-side collector
45 Negative electrode-side collector
46 Diffusion layer
47 Selectively oxygen-permeable membrane
48 Outer case
51 Air (atmosphere)
52 Oxygen
61 Positive electrode
62 Electrolytic solution for positive electrode
63 Pump for feeding electrolytic solution for positive electrode
64 Fuel passage
65 Vessel for storing electrolytic solution for positive electrode
71 Negative electrode
72 Electrolytic solution for negative electrode
73 Pump for feeding electrolytic solution for negative electrode
74 Fuel passage
75 Vessel for storing electrolytic solution for negative electrode
66 Ion-exchange membrane

What is claimed is:

1. An electrolytic solution consisting of:

a sulfone; and a magnesium salt dissolved in the sulfone, wherein the magnesium salt comprises magnesium borohydride;

wherein the sulfone is at least one alkyl sulfone represented by $R_1R_2SO_2$, wherein $R_1$ and $R_2$ each represent an alkyl group; or an alkyl sulfone derivative, wherein the at least one alkyl sulfone is a methyl n-propyl sulfone, a methyl isopropyl sulfone, a methyl n-butyl sulfone, a methyl isobutyl sulfone, a methyl sec-butyl sulfone, a methyl tert-butyl sulfone, an ethyl methyl sulfone, an ethyl n-propyl sulfone, an ethyl isopropyl sulfone, an ethyl n-butyl sulfone, an ethyl isobutyl sulfone, an ethyl sec-butyl sulfone, an ethyl tert-butyl sulfone, a n-propyl n-butyl sulfone, a n-butyl ethyl sulfone, an isobutyl ethyl sulfone, or a sec-butyl ethyl sulfone, and wherein the alkyl sulfone derivative is ethyl phenyl sulfone.

2. The electrolyte solution of claim 1, wherein the at least one alkyl sulfone is the ethyl n-propyl sulfone.

3. The electrolyte solution of claim 1, wherein the at least one alkyl sulfone is the alkyl sulfone derivative.

4. The electrolyte solution of claim 1, wherein the magnesium salt does not contain a halide.

5. The electrolyte solution of claim 1, wherein a molar ratio of the sulfone to the magnesium borohydride is between about 50 and about 150.

6. The electrolyte solution of claim 5, wherein the molar ratio of the sulfone to the magnesium borohydride is between about 60 and about 120.

7. The electrolyte solution of claim 1, wherein undissolved magnesium salt is removed from the sulfone in the electrolytic solution.

8. The electrolyte solution of claim 1, wherein the magnesium salt is magnesium borohydride.

9. An electrochemical device comprising:
an electrolytic solution, wherein the electrolytic solution consists of:
a sulfone; and
a magnesium salt dissolved in the sulfone, wherein the magnesium salt comprises magnesium borohydride;
wherein the sulfone is at least one alkyl sulfone represented by $R_1R_2SO_2$, wherein $R_1$ and $R_2$ each represent an alkyl group, or an alkyl sulfone derivative,
wherein the at least one alkyl sulfone is a methyl n-propyl sulfone, a methyl isopropyl sulfone, a methyl n-butyl sulfone, a methyl isobutyl sulfone, a methyl sec-butyl sulfone, a methyl tert-butyl sulfone, an ethyl methyl sulfone, an ethyl n-propyl sulfone, an ethyl isopropyl sulfone, an ethyl n-butyl sulfone, an ethyl isobutyl sulfone, an ethyl sec-butyl sulfone, an ethyl tert-butyl sulfone, a n-propyl n-butyl sulfone, a n-butyl ethyl sulfone, an isobutyl ethyl sulfone, or a sec-butyl ethyl sulfone, and
wherein the alkyl sulfone derivative is ethyl phenyl sulfone.

10. The electrochemical device of claim 9, wherein the electrochemical device is a battery having an electrolyte layer comprising the electrolytic solution.

11. The electrochemical device of claim 9, further comprising at least one of a capacitor, a sensor or a magnesium ion filter.

12. The electrochemical device of claim 10, wherein the battery further comprises a positive electrode comprising a sulfur, a graphite fluoride, an oxide, or a halide.

13. The electrochemical device of claim 12, wherein the oxide or the halide comprises a metal comprising scandium, titanium, vanadium, chromium, manganese, iron, cobalt, nickel, copper, or zinc.

14. The electrochemical device of claim 9, wherein the at least one alkyl sulfone is the ethyl n-propyl sulfone.

15. The electrochemical device of claim 9, wherein a molar ratio of the sulfone to the magnesium borohydride is between about 50 and about 150.

16. The electrochemical device of claim 15, wherein the molar ratio of the sulfone to the magnesium borohydride is between about 60 and about 120.

17. The electrochemical device of claim 9, wherein the magnesium salt does not contain a halide.

18. The electrochemical device of claim 9, wherein the magnesium salt is magnesium borohydride.

19. The electrochemical device of claim 9, further comprising a negative electrode, wherein the negative electrode comprises a magnesium, a magnesium alloy, or a magnesium compound.

20. The electrochemical device of claim 9, wherein the at least one alkyl sulfone is the alkyl sulfone derivative.

21. A battery comprising:
a negative electrode;
a positive electrode; and
an electrolytic solution, wherein the electrolytic solution consists of:
a sulfone; and
a magnesium salt dissolved in the sulfone, wherein the magnesium salt comprises magnesium borohydride;
wherein the sulfone is at least one alkyl sulfone represented by $R_1R_2SO_2$, wherein $R_1$ and $R_2$ each represent an alkyl group, or an alkyl sulfone derivative,
wherein the at least one alkyl sulfone is a methyl n-propyl sulfone, a methyl isopropyl sulfone, a methyl n-butyl sulfone, a methyl isobutyl sulfone, a methyl sec-butyl sulfone, a methyl tert-butyl sulfone, an ethyl methyl sulfone, an ethyl n-propyl sulfone, an ethyl isopropyl sulfone, an ethyl n-butyl sulfone, an ethyl isobutyl sulfone, an ethyl sec-butyl sulfone, an ethyl tert-butyl sulfone, a n-propyl n-butyl sulfone, a n-butyl ethyl sulfone, an isobutyl ethyl sulfone, or a sec-butyl ethyl sulfone, and
wherein the alkyl sulfone derivative is ethyl phenyl sulfone.

22. The battery of claim 21, wherein the negative electrode comprises a magnesium, a magnesium alloy, or a magnesium compound.

23. The battery of claim 21, wherein the at least one alkyl sulfone is the ethyl n-propyl sulfone.

24. The battery of claim 21, wherein the negative electrode comprises an electrolyte layer comprising the electrolytic solution.

* * * * *